(12) United States Patent
Daily et al.

(10) Patent No.: US 7,873,992 B1
(45) Date of Patent: *Jan. 18, 2011

(54) DYNAMIC SYSTEM OF AUTONOMOUS PARSERS FOR INTERPRETING ARBITRARY TELECOMMUNICATION EQUIPMENT STREAMS

(75) Inventors: Daniel J. Daily, Westminster, CO (US); Lisa Y. Kawahara, Colorado Springs, CO (US); Peter Andre Christopher Kirslis, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1293 days.

This patent is subject to a terminal disclaimer.

(21) Appl. No.: 10/728,730

(22) Filed: Dec. 4, 2003

(51) Int. Cl.
*G06F 9/00* (2006.01)
*G06F 15/16* (2006.01)
*G06F 17/00* (2006.01)

(52) U.S. Cl. .......................... 726/11; 726/22
(58) Field of Classification Search .................. 726/11, 726/22
See application file for complete search history.

(56) References Cited

U.S. PATENT DOCUMENTS

| | | | |
|---|---|---|---|
| 5,161,158 A * | 11/1992 | Chakravarty et al. ............ 714/26 |
| 5,276,776 A * | 1/1994 | Grady et al. ................... 706/48 |
| 5,542,024 A | 7/1996 | Balint et al. |
| 5,546,507 A | 8/1996 | Staub |
| 5,678,039 A | 10/1997 | Hinks et al. ................. 395/604 |
| 5,720,008 A | 2/1998 | McGuinness et al. |
| 5,805,808 A * | 9/1998 | Hasani et al. ................ 709/243 |
| 5,809,212 A * | 9/1998 | Shasha ......................... 706/46 |
| 5,812,851 A | 9/1998 | Levy et al. ................... 395/705 |
| 5,845,283 A | 12/1998 | Williams et al. ............. 707/101 |
| 5,974,405 A | 10/1999 | McGuinness et al. |
| 6,040,789 A | 3/2000 | Nishida et al. ................. 341/50 |
| 6,374,261 B1 * | 4/2002 | Alvarez et al. ............... 707/200 |
| 6,408,350 B1 | 6/2002 | Kawamura et al. ............ 710/62 |
| 6,490,371 B1 * | 12/2002 | Aoki et al. ................... 382/232 |
| 6,523,172 B1 * | 2/2003 | Martinez-Guerra et al. . 717/143 |
| 6,549,918 B1 | 4/2003 | Probert, Jr. et al. |
| 6,807,585 B2 * | 10/2004 | Kovacevic ...................... 710/5 |
| 6,886,166 B2 * | 4/2005 | Harrison et al. ............. 719/313 |
| 7,035,335 B1 * | 4/2006 | Iacobelli et al. ......... 375/240.25 |
| 7,093,292 B1 * | 8/2006 | Pantuso ....................... 726/23 |
| 7,187,694 B1 * | 3/2007 | Liao ........................... 370/474 |
| 7,233,597 B2 * | 6/2007 | Kumar et al. ............... 370/401 |
| 7,337,314 B2 * | 2/2008 | Hussain et al. .............. 713/151 |
| 7,366,961 B1 * | 4/2008 | Kovacevic et al. .......... 714/701 |
| 7,391,735 B2 * | 6/2008 | Johnson ...................... 370/246 |
| 7,434,225 B2 * | 10/2008 | Groetzner et al. ........... 719/313 |

(Continued)

FOREIGN PATENT DOCUMENTS

| | | |
|---|---|---|
| WO | WO 98/14017 | 4/1998 |
| WO | WO 03/052688 | 6/2003 |

OTHER PUBLICATIONS

Background of the invention for the above captioned application (previously provided).

(Continued)

*Primary Examiner*—David García Cervetti
(74) *Attorney, Agent, or Firm*—Sheridan Ross P.C.

(57) ABSTRACT

A system for parsing an arbitrary input stream is provided that includes a plurality of parsers 304a-n operable to parse an input stream, each parser corresponding to a unique input structure, and a parser selection agent 300 operable to receive the input stream and select a subset of the plurality of parsers to parse the input stream.

28 Claims, 8 Drawing Sheets

U.S. PATENT DOCUMENTS

| | | | | |
|---|---|---|---|---|
| 7,463,630 | B2* | 12/2008 | Lee | 370/392 |
| 7,551,575 | B1* | 6/2009 | Aleksandrowicz | 370/321 |
| 7,657,933 | B2* | 2/2010 | Hussain et al. | 726/14 |
| 7,661,130 | B2* | 2/2010 | Hussain et al. | 726/14 |
| 7,680,037 | B2* | 3/2010 | Cortes et al. | 370/230 |
| 7,724,740 | B1* | 5/2010 | Wang et al. | 370/392 |
| 2002/0141449 | A1* | 10/2002 | Johnson | 370/473 |
| 2004/0010780 | A1* | 1/2004 | Garvin | 717/143 |
| 2004/0042470 | A1* | 3/2004 | Cooper et al. | 370/401 |
| 2004/0156371 | A1* | 8/2004 | Kumar et al. | 370/401 |
| 2005/0004942 | A1* | 1/2005 | Madsen et al. | 707/104.1 |
| 2005/0060558 | A1* | 3/2005 | Hussain et al. | 713/189 |

OTHER PUBLICATIONS

Berghofer "Proofs, Programs and Executable Specifications in Higher Order Logic", available at http://deposit.ddb.de/cgi-bin/dokserv?idn=969627661&dok_var=d1&dok_ext=pdf &filename=969627661.pdf, Jun. 18, 2003, 175 pages.

Nipkow et al., "Isabelle/HOL: A Proof Assistant for Higher-Order", published by Springer-Verlag, Feb. 26, 2002, 231 pages.

Berghofer "Program extraction in Isabelle", available at http://www4.in.tum.de/~berghofe/papers/TYPES2002_slides.pdf, date unknown, pp. 1-27, Apr. 2002.

U.S. Appl. No. 11/962,799, filed Dec. 21, 2007, Daily et al.

Frohlich et al., "Using Extended Logic Programming for Alarm-Correlation in Cellular Phone Networks", available at http://www.biotech.tu-dresden.de/schroeder/group/papers/sch_iea99.pdf date unknown, 12 pages, 1999.

Barkai "Automatic Generation of a Diagnostic Expert System from Failure Mode and Effect Analysis (FMEA) Information", available at http://www.fmeainfocentre.com/download/SAE99.pdf, International Congress and Exposition, Detroit Michigan, Mar. 1-4, 1999, pp. 1-6.

Kummerow et al., "Interpretive Guide for the MBTI Expanded Analysis Report", Consulting Psychologists Press, Inc., 1992, 73 pages.

Briggs et al., "Myers-Briggs Type Indicator", Consulting Psychologists Press, Inc., 1990, 7 pages.

Bacon "Leadership through Influence", Lore International Institute, 1994, pp. 1-161.

Schmidt "Denotational Semantics—A Methodology for Language Development", Allyn and Bacon, Inc., 1986, 344 pages.

Myers et al., "MBTI Manual a Guide to the Development and Use of the Myers-Briggs Type Indicator", Consulting Psycologists Press, Inc., 1998, 441 pages.

* cited by examiner

US 7,873,992 B1

DYNAMIC SYSTEM OF AUTONOMOUS PARSERS FOR INTERPRETING ARBITRARY TELECOMMUNICATION EQUIPMENT STREAMS

FIELD OF THE INVENTION

The present invention is directed generally to parsers and specifically to parsers for interpreting arbitrary streams of information.

BACKGROUND OF THE INVENTION

FIG. 1 depicts a prior art architecture for processing alarms from enterprise telecommunications components, such as Private Branch Exchanges and media servers. The alarm processing system comprises the enterprise telecommunications component 100 and an alarm handler 104 both of which are in communication with an enterprise modem 108 and an enterprise Local Area Network or LAN 112. Through an enterprise gateway 116, the enterprise telecommunication component 100 and alarm handler 104 are in communication with a Wide Area Network 120, such as the Internet, and to a service provider's gateway 124. Through the enterprise modem 108, the telecommunications component 100 and alarm handler 104 are in communication with the Public Switched Telephone Network or PSTN 128 and to a service provider's modem 132 and service router 136. The service provider is, for example, a manufacturer that monitors products in the field or an entity, such as Norstan™, hired by the operator of the enterprise network to monitor and process alarms in the enterprise network. Communications received either through the service gateway 124 and the service router 136 are directed to a firewall 140. From the firewall 140, the communications are directed via a LAN 144 of the service provider to a service provider alarm fault manager 148.

The alarm handler 104 receives alarms and/or error messages from the enterprise telecommunication component 100, reads the alarm and/or error messages, optionally adds additional information depending on the application, formats, and forwards the alarms to the alarm fault manager 148 either via a serial interface (not shown) and the enterprise modem 108, typically in ASCII form, or via an ethernet interface (not shown), typically in a collection of packets constructed as defined in the TCP/IP suite of protocols. The alarm handler 104 can add to the alarm and/or error message a standardized header to aid in parsing the alarms or route the alarms to specific alarm reception centers that anticipate the form of the alarm.

The alarm fault manager 148 accepts and processes messages received from the alarm handler, logs the messages and passes the processed information to the database 152. The manager 148 comprises an encoder 156, an IP alarm manager 160, and a formatting agent 164. The encoder 156 passes processed Simple Network Management Protocol or SNMP messages from the alarm handler 104 to the formatting agent 164 and receives the messages back in ASCII form. An example of a suitable encoder is the G2™ encoder manufactured by Gensym™. The formatting agent 164 also formats the messages into a specified format for further processing. The formatting agent 164 further includes various parsers to parse the received messages and an encoder application (not shown) to encode the alarm information into the fields in the specified format. The encoder 156 correlates and filters the messages, and the IP alarm manager 160 provides an application processing interface with the database 152 for the processed, correlated and filtered messages.

The service provider typically monitors alarms generated by various types of enterprise telecommunication components and alarm handlers. For example, the telecommunication components can be PBX's made by manufacturers including Avaya Inc.™, Northern Telecom™, and Siemens™. The alarm handler can also be made by different manufacturers, such as the Access Security Gateway™ manufactured by Ion Network™ and Site Event Buffer™ manufactured by Teltronics™. The ability to process the arbitrary streams from various manufacturers using differing alarm syntaxes, symbols, and formats is limited. The alarm messages are vendor specific and not standardized. In addition, an alarm stream of one syntax and format may be nested deep within another alarm stream of a different syntax and format without any header information to help differentiate among the differing alarm streams. To make matters worse, some alarm formats are proprietary and must be reverse engineered. The parsers currently in the formatting agent 164 employ rather simplistic parsing techniques that are often unable to parse accurately the alarm streams, thereby diminishing the ability of the service provider to accurately and effectively monitor the alarms received from the enterprise network.

SUMMARY OF THE INVENTION

These and other needs are addressed by the various embodiments and configurations of the present invention. The present invention is directed to parser designs able to parse streams of information containing differently structured information and differently structured streams of information generated by one of a number of possible computational sources.

In a first embodiment, a method for parsing an arbitrary input stream is provided that includes the steps of:

(a) receiving an input stream that includes information defined by first and second input structures;

(b) providing some or all of the input stream to one or more of a number of parsers;

(c) receiving output from each of the parsers; and (d) performing one or more of the following substeps:

(i) selecting a first output from a first parser that corresponds to the first input structure and a second output from a second parser that corresponds to the second input structure; and (ii) selecting a first parser corresponding to the first input structure to parse one or more first segments of the input stream and a second parser corresponding to the second input structure to parse one or more second segments of the input stream. Typically, each of the parsers corresponds to a unique set of grammar or grammar rules used by the respective parser when a parse is performed. As will be appreciated, an "input structure" refers to a formal description or dialect of a programming language or some other type of informational (e.g., data) structural description, and a "grammar" or grammar rule refers to the structure rules used by a parser and typically includes four components, namely a set of tokens or terminal symbols, a set of non-terminal symbols, a non-terminal symbol designated as a start symbol, and a set of productions. A grammar or grammar rule is typically unique to each type of input structure. As will be appreciated, substeps (i) and (ii) can be performed iteratively or recursively until a suitable parser match is found for each of the input structures.

A parsing agent typically manipulates a number of individual (autonomous) parsers. The parsing agent can provide a standardized, vendor independent method of identifying, parsing and classifying alarms/error messages for a variety of differing protocols, such as Northern Telecom™ PBX, Northern Telecom™ Meridian Mail™, Northern Telecom™ SNMP traps, Siemens™, Access Security Gateway™, and Site Event Buffer™ telecommunication equipment at a single, centralized site over commonly shared trunks.

The parsing agent can return a variety of differing outputs, which in a preferred configuration is a parse tree. The nodes of the parse tree can be traversed, using recursive function calls, to identify nodes requiring additional parsing or nodes of interest to a client.

The selection of the parser to parse differing portions of the input stream can be effected in many ways. In one configuration, one or more tokens are identified in the input stream, and, based on the identified tokens, one of a plurality of parsers is selected. As will be appreciated, "tokens" refer to a definition of a grouping of characters. Each token typically has a corresponding regular expression related to the grouping of characters. A "regular expression" refers to ways of defining a possible series of characters and normally include a regular-expression definition comprising a set of characters (the alphabet), productions, a set of operators, character classes, and grouping parentheses). In another configuration, the parser is typically selected when a match condition is found to exist based on the parsed output. Where multiple parsed outputs correspond to the same segment of the stream, it is determined which of the outputs most likely corresponds to the segment. The determination can be made using any suitable technique, such as a least squares fit analysis to assess the degree to which the output matches the segment. The output having the best fit is selected.

In a second embodiment, the method is performed by a dynamic system of autonomous parsers for converting arbitrary telecommunication data streams. The system behaves outwardly as a single parser. The system is dynamic in that it follows a trajectory in some space of points (defined in mathematics as a manifold). In the embodiment, the points represent discrete parsers. The parsers are autonomous because they are not informed about what sort of input they will receive. Accordingly, the parsers must cooperate and/or compete amongst themselves as to which ones will ultimately be applied. The system is arbitrary in and that the system may easily incorporate new data streams. The system is able convert telecommunication data streams in that the system transforms the input into a standard form rather than simply interpreting the input.

In another embodiment, an encoding agent is provided that transforms alarm/error messages received in a number of different formats and/or texts into a universal format and/or text for further processing. The encoding agent can provide not only a simple alarm type code but also include a maintenance object and additional operator data, known as the case object, to technicians and downstream software such as expert systems. The expert systems can use the case object to automatically service the alarmed equipment without human intervention, resulting in substantial cost savings. The encoding agent further can provide for the economies of multi-server/single queue alarm reception that reduce the number of public switch telephone network trunks required for alarm reception because all of the alarms are funneled through a single piece of hardware and software.

In yet another embodiment, a method for parsing computer generated information is provided that includes the steps of:

(a) receiving a stream of information generated by one of a number of possible different computational sources, with each computational source generating a stream corresponding to a unique input structure;

(b) comparing some or all of the stream with a set of tokens to provide a subset of tokens identified therein;

(c) heuristically identifying, from among a number of possible input structures and/or a number of possible computational sources, an input structure corresponding to the stream and/or a computational source that generated the stream; and (d) parsing the stream based on the identified input structure and/or computational source.

Each of the tokens can have a corresponding method expressing a set of syntactical and/or semantical relationships relating to the respective token or a set of tokens of which it is a member. In that event, the heuristically identifying step can invoke a corresponding method for each token in the subset of tokens. The methods can cause a set of flags to be assigned a corresponding set of values depending on the presence or absence of a syntactical and/or semantical relationship. The values of the flags are used to heuristically identify the input structure and/or computational source.

Unlike the prior art, this embodiment does not require the client to provide a flag external to the input stream to identify or assist in the identification of the input structure and/or computational source.

The various embodiments of the present invention can have a number of advantages compared to the prior art. For example, the present invention does not require the use of a standardized header in alarm/error messages because it can support communications from not only known alarm/error message sources but also arbitrary (nonstandardized) sources. This ability permits the use of a single centralized alarm/error message reception center. The single centralized alarm/error message reception center can provide the economies of multi-server/single queue alarm/error reception that reduces the number of public switch telephone network trunks, equipment, and staff required for alarm reception because all alarms are funneled through a single piece of software and hardware. The present invention can capture more detail than prior art systems and even more detail than is generally provided by the headers of alarm/error messages because formal language grammar descriptions can be used to generate automatically new alarm parsers. The use of grammars and parse trees can differ from prior art applications of formal language theory. In formal language theory, the practice is to have the parse trees generated from the grammar contain as much information about the input stream as possible; this results in very complex difficult-to-maintain grammars. The present invention commonly partitions the grammars into smaller, more maintainable segments that are then manipulated by the parser selection agent. The improved maintainability can reduce software support costs and new alarm streams can be more easily added.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Parsing and Encoding Agents

Figure 1:
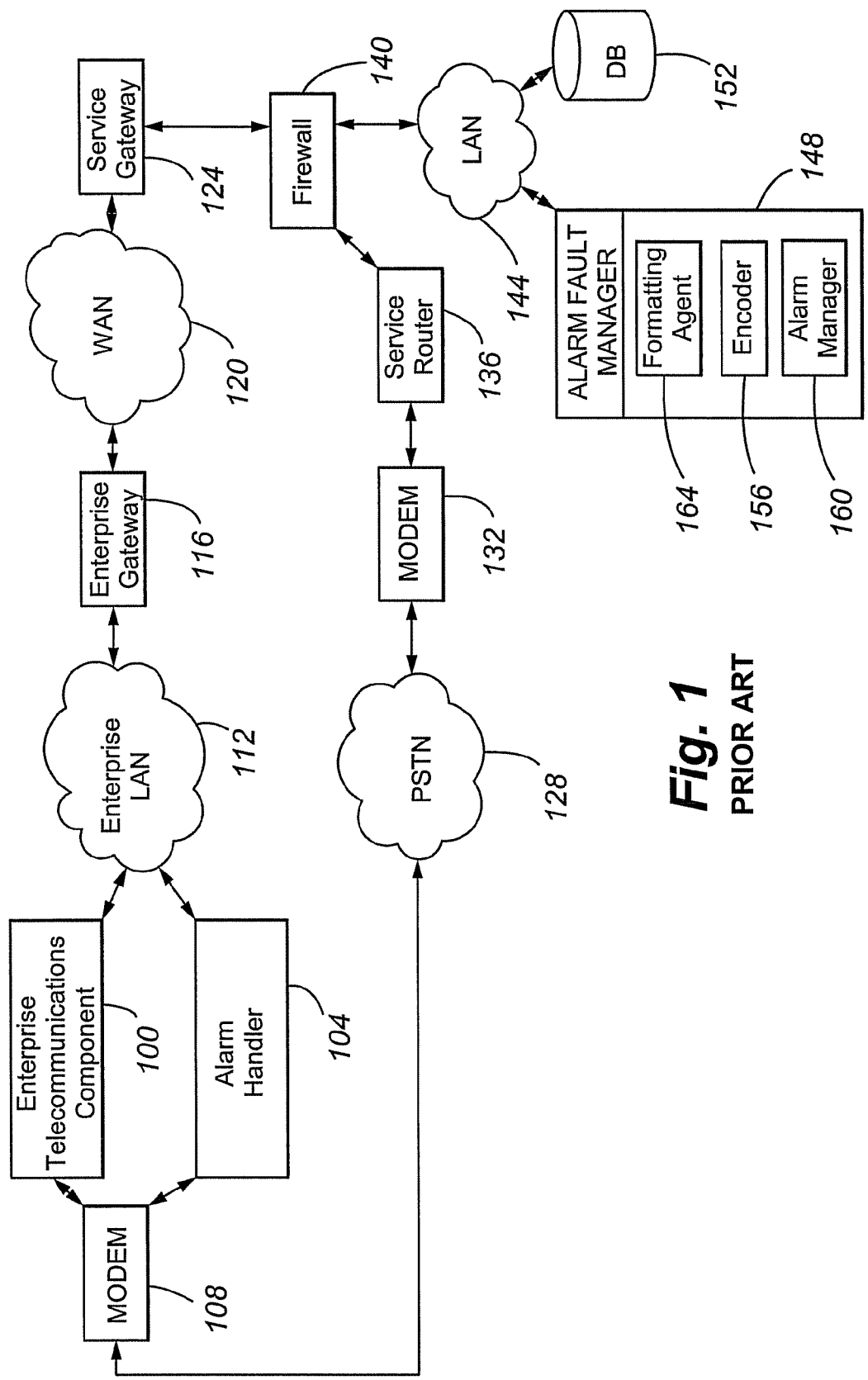
FIG. 1 is a prior art architecture for processing alarms.
Figure 2:
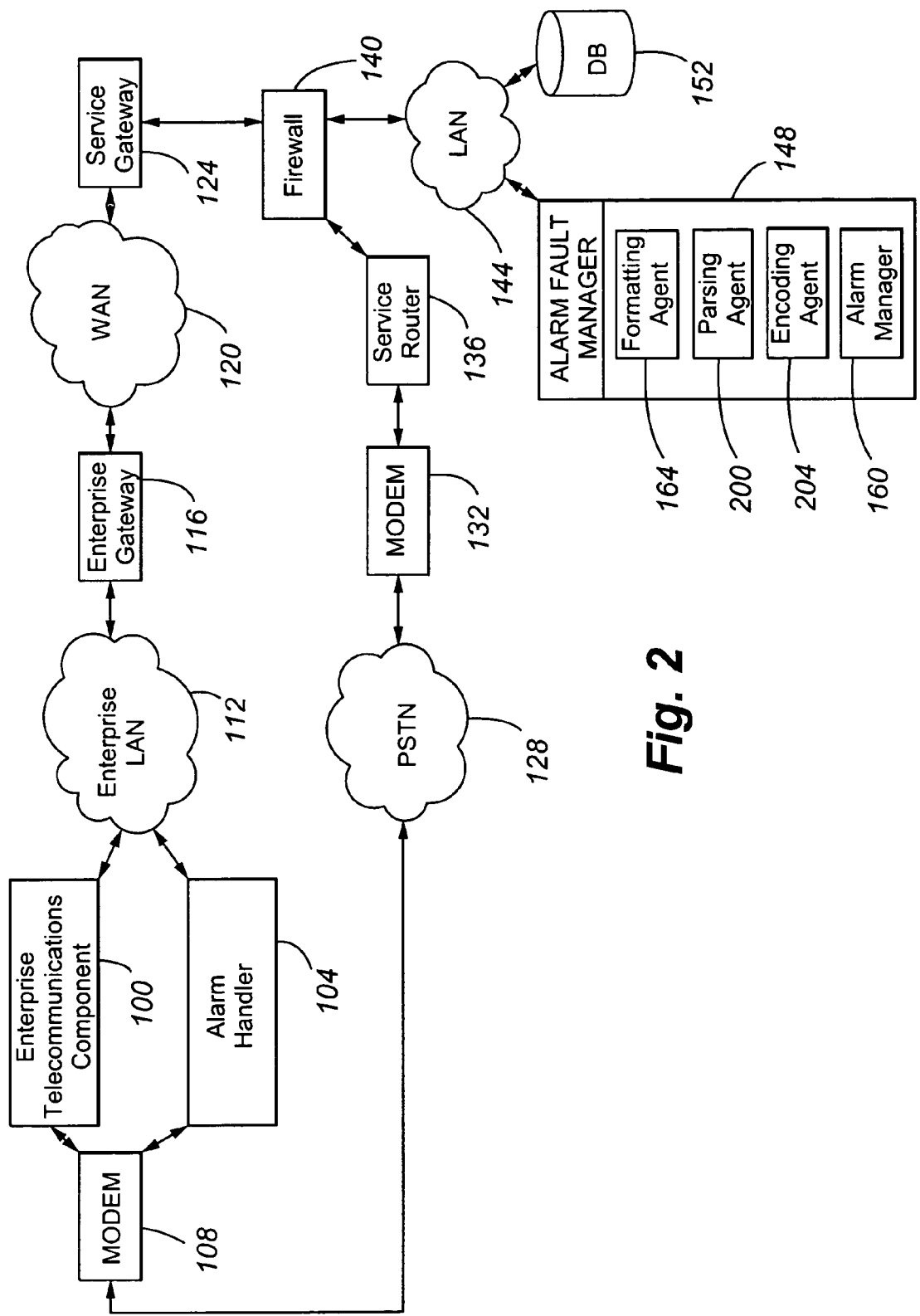
FIG. 2 is an alarm processing architecture according to a first embodiment of the present invention.

FIG. 2 shows an alarm processing architecture according to a first embodiment of the present invention. The architecture is the same as that of FIG. 1 except for the parsing and encoding agents 200 and 204. Unlike the architecture of the prior art, the alarm processing architecture is able to identify the various alarm and error messages received from differing types of telecommunication components and/or components of the same type from different manufacturers and optionally convert the alarm and error messages into a universal format for storage in the database 152.

Figure 3:
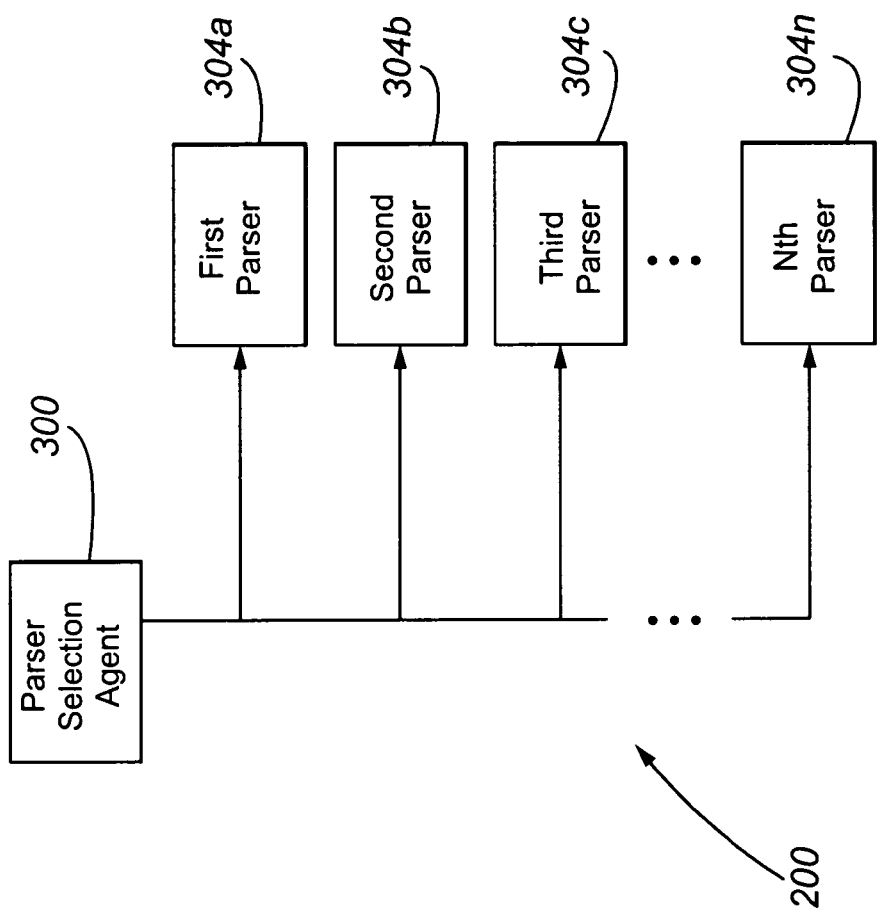
FIG. 3 is an exploded block diagram of the parsing agent of FIG. 2.

Referring to FIG. 3, a more detailed view of the components of the parsing agent 200 is provided. The parsing agent 200 includes a parser selection agent 300 in communication with a plurality of parsers 304a-n. The parser selection agent 300 is typically a higher-level object that selects which of the plurality of parsers 304a-n are able to effectively parse all or portions of the incoming data stream. The parsers can be configured in a software design factory pattern. As noted previously, the incoming data stream is typically arbitrary in that it generally contains information having non-standard formats, which may be nested arbitrarily deep within one another without any header information to help differentiate among stream segments with different formats.

Using any of a number of selection techniques, the parser selection agent receives an input stream to be parsed and selects one or more parsers to receive all or specified parts of the stream. The technique, for example, can be to select all of the parsers, a subset of the parsers, and each individual parser in sequence after the previously selected parser provides parsed information. The selection process may be recursive or non-recursive, depending on the application.

Each of the parsers 304a-n can be any suitable computational component that identifies structure in information (e.g., data or code) and produces defined output based on the identification. The parser can employ any selected parsing algorithm, such as LL(k), operator precedence, simple precedence, SLR(k), LALR(k), LR(k), and general context free. As will be appreciated, "S" refers to simple, "LA" to look ahead, the first letter refers to how the input is read (L=left-to-right and R=right-to-left), the second letter refers to the kind of parse produced (L=leftmost derivation and R=rightmost derivation), and k refers to the number of lookahead symbols considered.

Each of the parsers 304a-n is defined by a unique input structure and a set of grammars/grammar rules that define what type of information it can successfully parse. For example, the first parser 304a uses a first input structure and set of grammars/grammar rules to parse information having a first structure, and the second parser 304b uses a second input structure and set of grammars/grammar rules to parse information having a second structure. The first and second structures are different, and the first and second sets of grammars/ grammar rules are different. In another example, the first parser 304a parses a first programming language and the second parser 304b a second different programming language.

In one configuration, the parser selection agent 300 is configured to perform prefiltering using regular expressions or tokens to make heuristic guesses about the input structure and therefore the appropriate parser(s) to select. For example, the agent can be configured to identify unique characters, groups of characters, or arrangements of characters that indicate a corresponding input structure of the information and provide the stream to the parser corresponding to that input structure. For example, the parser selection agent 300 can use lexical and grammar rules to identify a most likely parser or set of parser(s) to parse the information.

The parser selection agent 300 determines if there is a match between a selected parser and an assigned portion of the stream by evaluating the output received from the parser. A "match", for example, can exist when a selected type of, a recognizable, a predetermined, and/or a defined output is received. For example, the output for a match to exist can be a concrete or abstract syntax parse tree, a simple recognizable string, a "true" or "false" indication, one or more symbol tables, a number, and/or other data structures as appropriate to the application. As will be appreciated, a "concrete" parse tree is a structure that shows the syntax or structure of the input while an "abstract" parse tree is a structure that shows the semantics or meaning of the input. A "no match" can exist when the selection agent 300 receives a defined feedback, such as a null value, an error message, or a failure message, from the selected parser.

Where a single stream comprises multiple, differing input structures, which may be nested or embedded in one another, the selection agent 300 can initially divide the stream into separate strings and provide each string to a selected parser or group of parsers or provide the entire stream to each of a number of selected parsers either concurrently or sequentially. In the latter case, the parser may return acceptable and recognizable output on some portion of the stream and unacceptable and recognizable output on the other portions of the stream.

Figure 4:
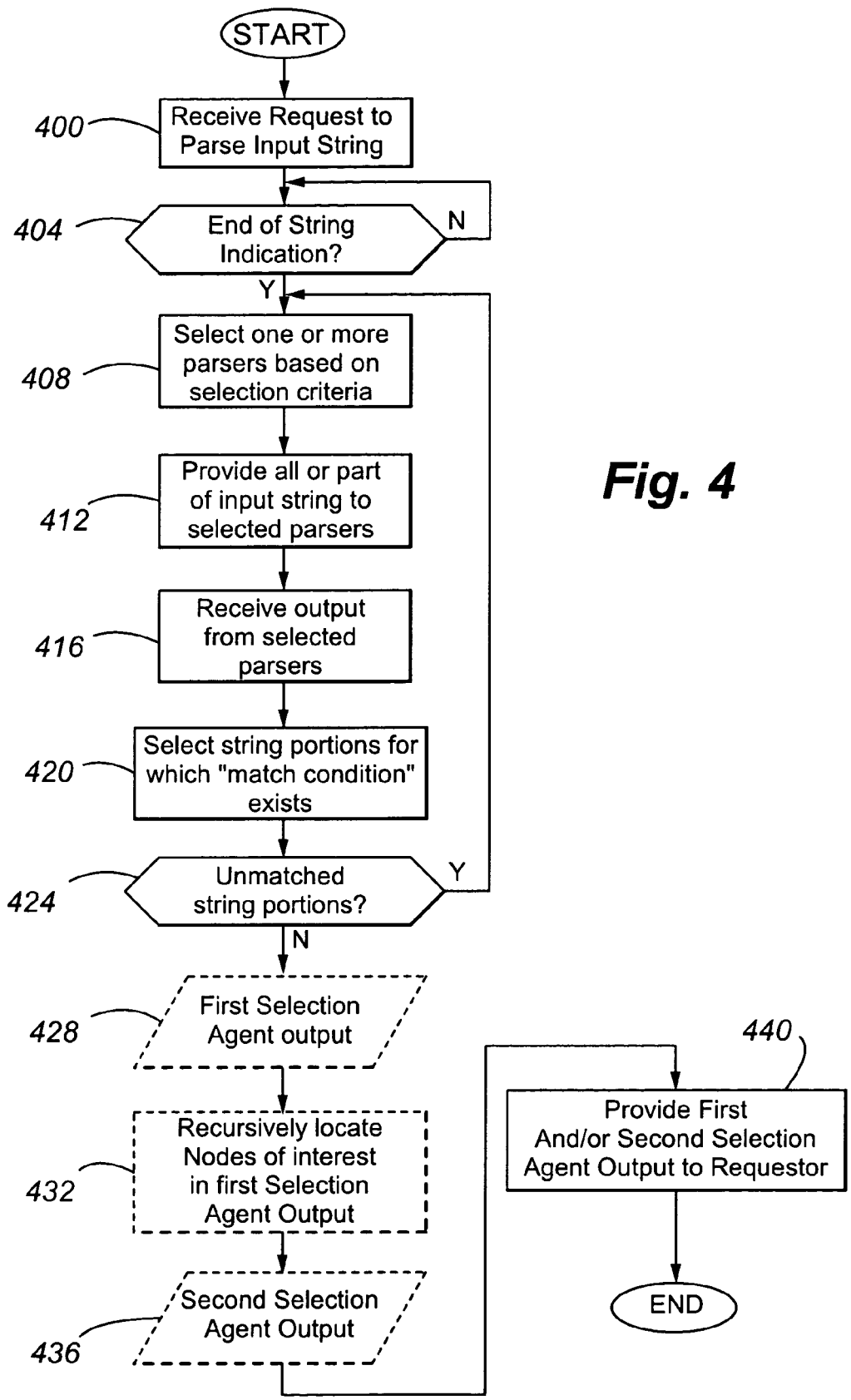
FIG. 4 is a flow chart of the operation of the parser selection agent of FIG. 3.

Referring now to FIG. 4, the operation of the parser selection agent 300 will now be described.

In step 400, the parser selection agent 300 receives a request to parse an input stream and receives the input stream. The request can include an indication of specific symbols or characters in the stream for which a parser is to be selected. The request can also include criteria for the parsed output depending on the type of parser requested.

In decision diamond 404, the agent 300 determines whether the input stream comprises an end of string indication. It not, decision diamond 404, is repeated until the indication is received. If so, the agent 300 proceeds to step 408.

In step 412, the agent 300 selects one or more parsers based on defined selection criteria. The selection criteria is discussed above.

In step 412, the agent 300 provides all or part of the input stream (or string) to the parsers selected in step 408 along with a command to parse the provided information and return a specific type of output. For example, the command "parse file" followed by the name of a file and the name of string commands the parser to parse the identified string (located in the named file) and return an abstract syntax parse tree. The command can be sent only to the selected parser(s) or be sent to an application programming interface or API and include a "type" field, which indicates which of the parsers is to execute the command. The type field is indicative of a particular input structure. The API would select the parser to execute the command based on the type field.

Figure 5:
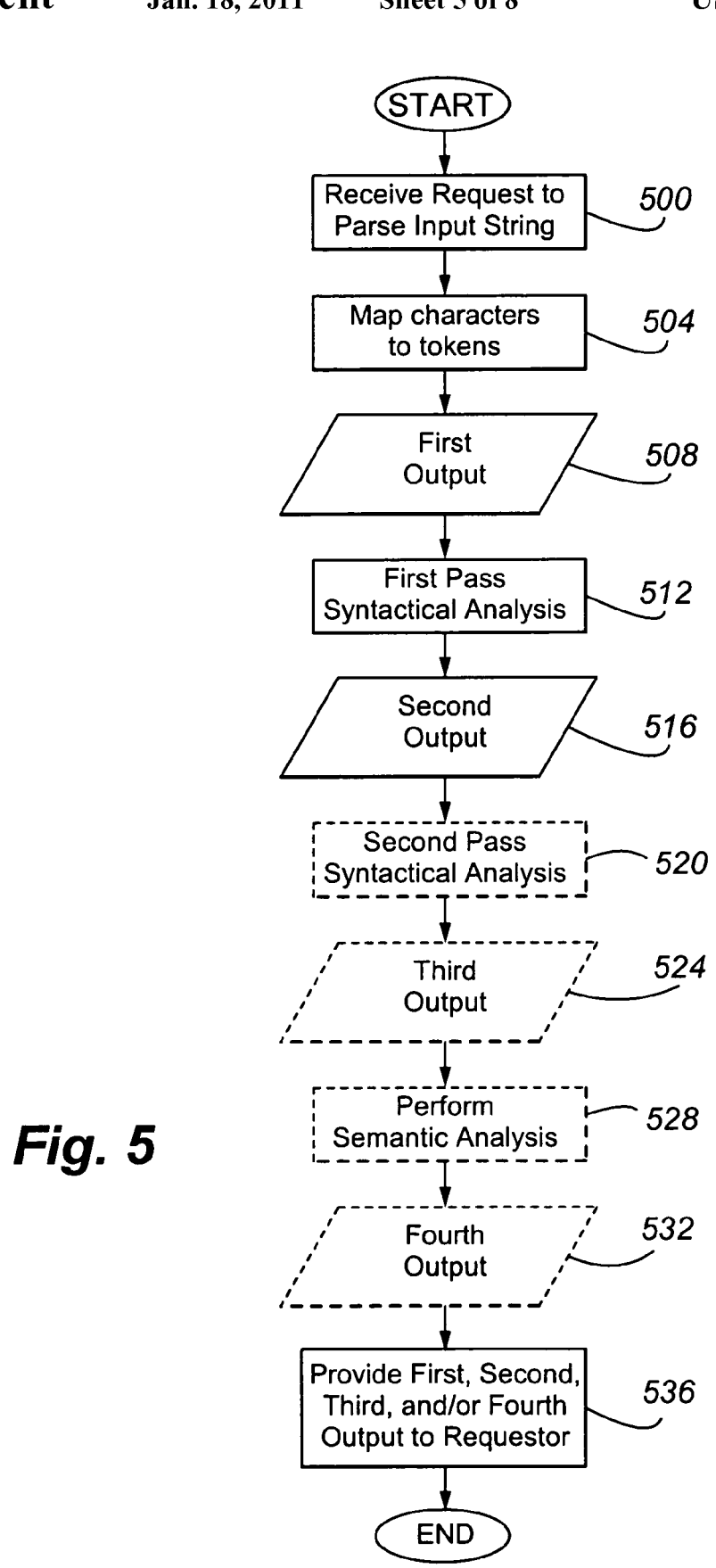
FIG. 5 is a flow chart of the operation of each of the parsers of FIG. 3.

FIG. 5 depicts the parsing process applied by each of the selected parsers.

In step 500, the parser receives the request to parse and the input string.

In step 504, the characters in the string are mapped by a lexer to tokens using the tokens' respective regular expressions to provide a first output 508. The first output is useful where an input stream is being scanned to determine structure without the construction of a parse tree or where only a few pieces of information need to be extracted.

In steps 512 and 500, first pass syntactical analysis is performed in which tokens are grouped into structured phrases. The grouping can be effected in one pass to produce a second output 516 or multiple passes to form a third output 524. In the single pass configuration, analysis and synthesis are performed concurrently. In the multiple pass configuration, analysis is performed first and synthesis second. The third output is typically a parse tree, which is traversed during the synthesis phase. As will be appreciated, only tokens of interest are included in the nodes of the parse tree.

In step 528, semantic analysis is performed. Semantic analysis assigns meaning to structure or to the third output 524 to produce a fourth output 532. As will be appreciated, semantical analysis can be performed as tokens are processed, as a separate pass after a parse tree is constructed as shown in step 528, or at both of these times. Any of a number of techniques can be used, from informal code fragments to formal attribute grammars. Attribute grammars associate data elements with nodes, specify equations to propagate the data, and a mechanism to perform the evaluation. When attribute grammars are used, each of the parsers 304a-n corresponds to a unique set of attribute grammars.

In step 536, any of the first, second, third or fourth outputs are provided to the parser selection agent 300.

Referring again to FIG. 3 in step 416, the agent 300 receives output from the selected parser(s) and in step 420 selects the portions of the output from the selected parser(s) for which a "match" condition is found. Where multiple parser(s) return a parse output, known mathematical techniques, such as a least squares fit, can be used to determine which of the parser(s) is a true match for the corresponding portion of the input string. In decision diamond 424 if any portion of the string only has a "no match" condition on any portion of the string, the agent 300 can return to step 408 and select one or more additional parsers using the criteria previously described. This is effected by comparing the successfully parsed string portions against the original stream and identifying string portions which were not successfully parsed. When no parser can be found to match a portion of the stream or the entire stream, an error message may be returned to the requestor or client.

In one embodiment, recursive node processing can be performed on a parse tree output to identify nodes requiring additional parsing. In recursive node processing, the agent 300 analyzes the nodes of the parse tree (e.g., evaluate the types of nodes in the tree) and, based on the nodal analysis, selects one or more additional set(s) of parsers to parse the identified nodes.

The successfully matched portions of the stream is an optional first selection agent output 428 to be returned to the requesting computational component.

In step 432, the agent 300 can perform recursive node processing of the output when the output is a tree structure to identify nodes of interest to the requestor. The identified nodes of interest form an optional second agent output 436.

In step 440, the first and/or second selection agent output 428, 436 is provided to the client requestor.

In another parser system configuration which is referred to hereinafter as the chain of unique responsibility parser, the parser system output is different in certain respects from that of the parser system configuration described above. The chain of unique responsibility parser appears to a client (either a human user or a software application) as a single parser that is invoked with an input string of characters or input stream to be parsed and, like the previously described parser system configuration, returns to the client some set of data structures that describe the structure of the input. These data structures may include a parse tree, one or more symbol tables, and/or other data structures as appropriate to the application. The difference in output from the previously described configuration is that, when no parser can be identified to handle the input stream or more than one can be identified, then an error message is returned to the client. In the case of the previously described parser system configuration, it is possible to have more than one parser be able to parse the same or differing segments of the input stream without an error condition.

The chain of unique responsibility parser is applied in a dynamic data environment, with new language dialects and parsers being added periodically. These extensions need to be incorporated while minimizing the potential for introducing errors in the previously existing implementation.

Internally, the chain of unique responsibility parser is configured as depicted in FIG. 3, namely a higher level parser selection agent 300 and a set of lower level parsers 304a-n, with each parser 304a-n being configured to parse a different language dialect. The beginning of the input string to be parsed is passed to each parser, either sequentially or in parallel, to make a determination as to whether each parser can parse the input. Each parser receives input of sufficient length, based on the parser, to be able to accept (a "match" condition) or reject (a "no match" condition) the received string. When no parser can parse the received string (there is no "match" condition), an error message is returned to the client. When multiple parsers indicate a "match" condition, an error message is also returned to the client since each input string is a distinct language dialect to be processed by a distinct parser. The latter situation indicates either an incomplete input string fragment or an implementation error in one or more parsers. It is preferable to detect a problem as soon as possible to facilitate repair and to prevent erroneous processing by the wrong parser resulting in incorrect output. When a unique parser is identified (only one "match" condition is found), it is passed the entire input string for processing and the result of the parse is returned to the client.

The Encoding Agent

The encoding agent 204 encodes alarms and error messages of differing types and formats/structures into a standard format/structure. In one configuration, the encoding agent 204 uses a software pattern called an abstract adapter. The encoder includes the following components: (a) a parse tree, such as an abstract syntax tree, with uniquely named nodes (which contain information of interest) provided by the parser selection agent 300; (b) an abstract iterator or search engine (not shown) used to traverse the parse tree; and (c) a formatting engine (not shown) that uses the abstract iterator to locate nodes of interest and convert the associated alarm text to a standard format.

The standardized format of the alarms/error messages includes a plurality of fields. The fields include a first field comprising a prefix and a product ID/alarm ID (identifying the alarmed component and/or component issuing the alarm), a second field comprising a space character, a third field comprising the day of the month for the alarm/error event, a fourth field comprising a field separator, a fifth field comprising the hour of the day of the alarm/error event, a sixth field comprising a field separator, a seventh field comprising a minute of the alarm/error event, an eighth field comprising a field separator, a ninth field comprising an alarm/error type indicator, a tenth field comprising a field separator, an eleventh field comprising alarm information (e.g., the text of the alarm/error message), and a twelfth field comprising a space character.

Figure 6:
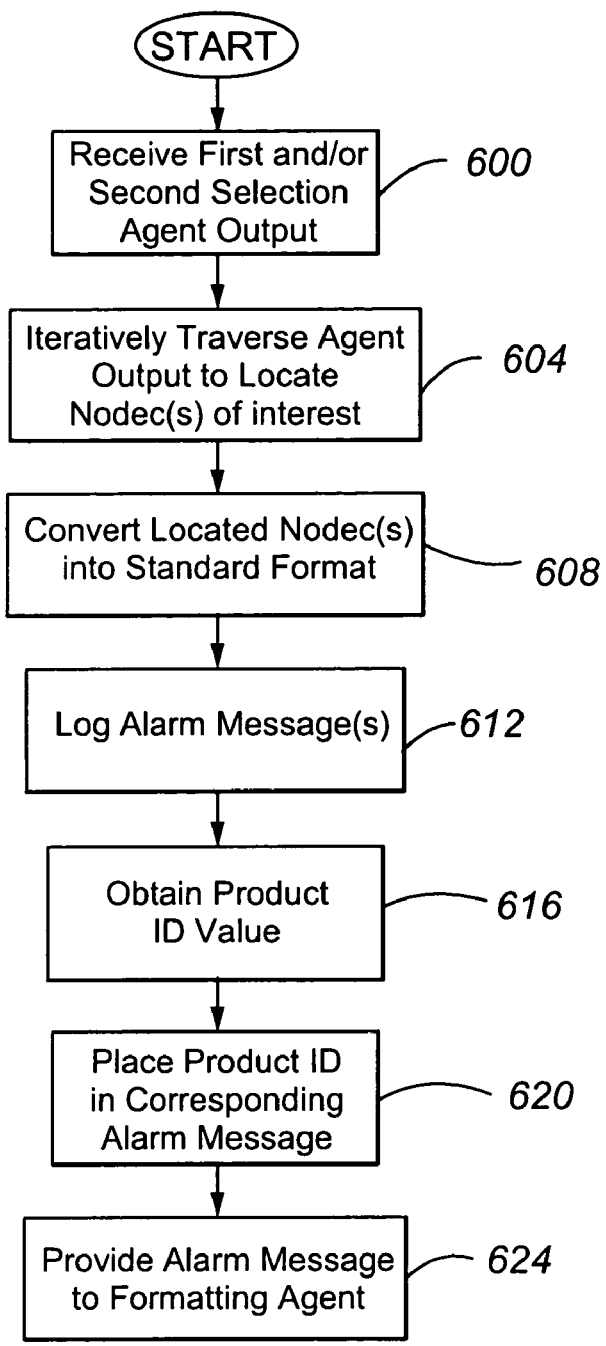
FIG. 6 is a flow chart of the operation of the encoding agent of FIG. 2.

The operation of the encoding agent 204 will be discussed with reference to FIG. 6.

In step 600, the encoding agent receives the first and/or second selection agent output 516, 524. As noted, the output is preferably in the form of a parse tree, the nodes of which contain desired or selected information.

In step 604, the encoding agent 204 iteratively traverses the nodes of the parse tree to locate node(s) of interest. As will be appreciated, the nodes can include any of a number of structures such as a token, a regular expression, a boolean truth value, a string, and/or a number. This is typically done by identifying defined information in the nodes that is of interest.

In step 608, the formatting engine converts each of the located node(s) of interest into a standard format. This step may be performed as each node is located or after all of the nodes are located and marked in some manner, such as using a flag. The engine enables alarms/error messages from different manufacturers and types of devices to be placed in a common format and, in some configurations, using common characters or a standard text to define similar types of events/information. For example, an alarm value "03" of one alarm protocol will be converted to a corresponding standard alarm value in a standard protocol, such as "01", for a common type of alarm.

In step 612, the alarm message is logged by the alarm fault manager 148.

In step 616, the encoding agent 204 obtains the product ID value (if not already in the alarm/error message), and in step 620 places the product ID value in the corresponding alarm/error message.

In step 624, the revised alarm/error message is provided to the formatting agent 164 when further processing is required or to the alarm manager 160 for entry into the database 152.

Autonomous Heuristic Parser

In another embodiment, an autonomous heuristic parser is provided. The autonomous heuristic parser is designed to parse a set of computer-generated data from a number of sources, such as the digital screen representations from various telecommunications systems, without being informed ahead of time which computational component source the data was generated by (in the case of screens, without being informed ahead of time from which screen the input was taken). In a prior art approach, a tag is passed to the parser indicating the type of screen from which the input string was taken, along with the input string to be parsed, to direct the parser how to parse the string to locate the desired information. The tag, for example, informs the parser what part of the string to ignore and what to parse. However, this approach requires an extra selection step to select a parser and has the potential to cause an error return or incorrect parsed output if the wrong tag is supplied to the parser with the input. In the autonomous heuristic parser, only the input string is provided. No external tag is supplied to the parser with the input string.

The parser is able to determine autonomously, using a declarative programming rather than a procedural programming approach, from the beginning of the string which set of screens (or which set of sources) are candidates to have generated the input and then heuristically narrow the field to a single candidate and perform the parse without additional external information. The lexer of the heuristic parser is configured to ignore extraneous information in the string. The autonomous heuristic parser is applied typically in a static environment, in which all the language dialects are known at the time of the parser implementation.

Internally, the specifications of all language dialects to be parsed are preferably implemented with a single parser. In this configuration, the heuristic parser is configured to parse a plurality of differing input structures using a specification aggregating the varying input structures or tokens/grammars/grammar rules/attribute grammars for all of the input structures. As will be appreciated, the heuristic parser can also be implemented using a design similar to that of FIG. 3, in which a higher level object parser selection agent acts as the heuristic parser and, when a decision is made from a portion of the input stream as to which parser is a match, provides the entire input stream to an appropriate lower level parser to complete the parse of the stream. The latter implementation is, however, more complex and generally not preferred.

After parsing the beginning of the input string, the parser can determine autonomously which of the language dialects it has been given, without being told explicitly ahead of time by a tag which dialect to expect. This approach can eliminate a source of error in which the wrong dialect could be specified for an input string, resulting either in an error or an incorrect result.

Figure 7:
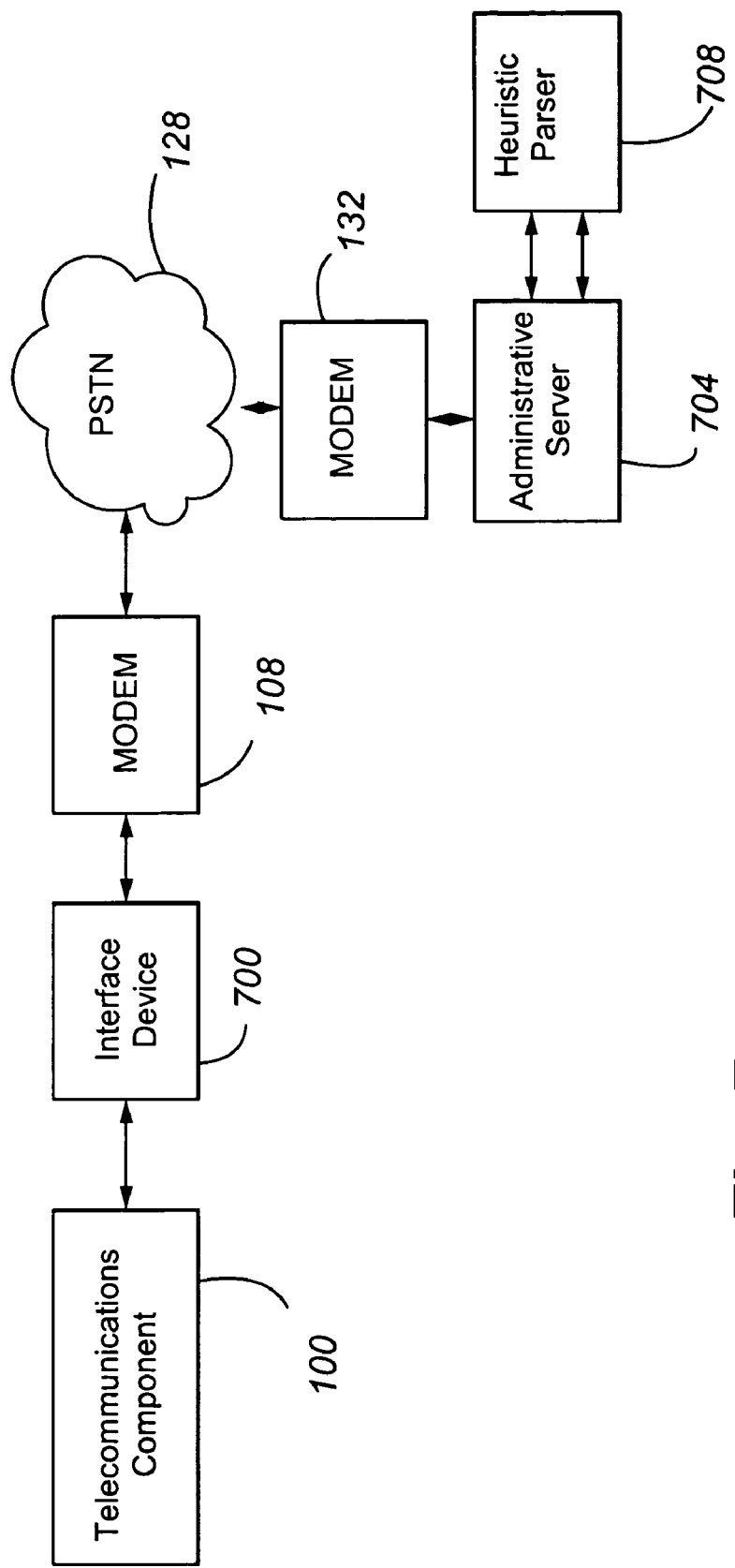
FIG. 7 is a computer output processing architecture according to a second embodiment of the present invention.

FIG. 7 depicts an illustrative architecture in which the autonomous heuristic parser is employed. As will be appreciated, the heuristic parser can be employed in any environment in which input strings are received from any one of a number of possible computational component sources.

Referring to FIG. 7, the architecture comprises an enterprise telecommunications component 100 such as PBX, in communication with an interface device 700, such as an Access Secured Gateway™ or Site Effect Buffer™. Modems 108 and 132 are provided to convey communications back and forth via the Public Switch Telephone Network 128. An administrative server 704 is provided at the service provider side of the communications link. The administrative server 704 includes, for example, an expert system. A heuristic parser 708 is in communication with the administrative server 704. The administrative server 704 requests that the PBX provide the digital representations of one or more PBX screens to permit the identification of selected information in the graphical information in the digital representation. As will be appreciated, the digital representation can include a variety of graphical information, such as hardware and/or software release numbers, font specifications, and displayed text.

In effect, the heuristic parser 708 compares the input stream to a group of tokens and grammars, identifies one or more tokens and grammars that match a parsed portion of the input stream, and, based on the identified set of tokens and grammars, identifies the appropriate input structure from a number of possible input structures to use in parsing the input string. The heuristic parser can use lexical analysis, syntactical analysis, semantical analysis, and a combination thereof to identify a group of potential input structures and finally the correct input structure. In lexical analysis, certain tokens and grammars can be unique to a particular input structure and other tokens and grammars shared by multiple input structures. In syntactical analysis, the tokens are grouped into structured phrases. In semantical analysis, meaning is assigned to the identified tokens. In a preferred embodiment, a table is provided listing tokens and, for each token, a corresponding method or routine to be invoked when the token is identified. The method or routine includes expressions of syntactical and/or semantical relationships involving or otherwise related to the presence of the respective token. When a token is identified and the corresponding method is invoked, various other characters or tokens, if identified, cause a flag to be set to a first state and if not identified cause the flag to be set to a second different state. Depending on the tokens identified and the flag setting(s), the further performance of lexical, syntactical and/or semantic analyses is directed and/or the source of the input stream or the input structure can be identified. Stated another way, the methods and flag setting(s) heuristically narrow down the field of candidate input structures to a single input structure.

A sample table of tokens in the form of regular expressions and corresponding methods is depicted below:

| TOKEN | METHOD |
| --- | --- |
| t=<ADDR2> | { addr2Action( t ); } |
| \| t=<DATA> | { dataAction( t ); } |
| \| t=<MENUCMD> | { menuCmdAction ( t ); } |
| \| t=<CSMONITOR> | { csMonitorAction ( t ); } |
| \| t=<SERVICE> | { serviceAction ( t ); } |
| \| t=<CUSTOMER> | { customerAction ( t ); } |
| \| t=<NODE> | { nodeAction ( t ); } |
| \| t=<SUPPORT> | { supportAction ( t ); } |

The specifications for the methods corresponding to tokens "<ADDR2>", "<DATA>", "<MENUCMD>", and "<CSMONITOR>" are as follows:

```
//   Called on ><ADDR2> tokens.
private void addr2Action ( Token t )
{
    ArtParserTokenManager . show_T ( ADDR2", t );
    curAddr = t.image;
}
//   Called on <DATA> tokens.
private void dataAction ( Token t )
{
    ArtParserTokenManager . show_T ( "DATA", t );
    // Look for "EMML" followed by a character that is not a space.
    // If found, save the rest of the string as the version number.
    if ( t.image.startsWith ( "EMML" ) ) {
        int c = t.image.charAt ( 4 );
        if ( c != 32 )
            version = t.image.substring ( 4 );
    }
    // Look for the string defined in refNumber (the 2nd if below),
    // and if found, set the sawRefNo flag. The very next DATA token
    // contains the version number. Next time we get here, the flag
    // is true, so pick out the 3 chars that comprise the version
    // number, and format them with '.' chars. Clear the flag.
    if ( sawRefNo ) {
        index = t.image.lastIndexOf ( " " );
        refVersion = t.image.substring( index+1 );
        version = refVersion . substring ( 7, 8 )
            + "."
            + refVersion . substring( 8, 9 )
            + "."
            + refVersion . substring( 9, 10 );
        sawRefNo = false;
    }
    else if ( t.image.equals( refNumber ) )
        sawRefNo = true;
    // Build a node that contains the version number.
    if ( ( vers == null ) && ( version != null ) ) {
```

-continued

```
        tree = new SimpleNode( "Start", null );
        vers = new SimpleNode( "Version", version );
        tree . AddChild( vers, 0 );
        vers . SetParent( tree );
    }
    // CS Monitor Screen
    if (onCSMonScr ) {
        if ( st == null )
            st = new SymTab( );
        String s = t.image;
        if ( ( rowService != null ) && ( curAddr.startsWith( rowService
            st . put ( ServiceText, t.image );
        else if ( ( rowCustomer != null ) && ( curAddr.startsWith) rowC
            st . put ( CustomerText, t.image );
        else if ( ( rowNode != null ) && ( curAddr.startsWith( rowNode
            st . put( NodeText, t.image );
        else if ( ( rowSupport != null ) && ( curAddr.startsWith( rowSu
            st . put ( SupportText, t.image );
    }
}
// Called on <MENUCMD> tokens.
private void menuCmdAction ( Token t )
{
    ArtParserTokenManager . show_T( "MENUCMD", t );
    // Check the end of the menu cmd strings for the commands
    // in which we're interested (target1 & 2), and if found,
    // save the associated cmd tag in the . . .Tag. variable.
    // Build a node that contains the command tag.
    if ( t.image.endsWith( target1 ) ) {
        targetTag1 = t.image.charAt ( 0 );
        tag = new SimpleNode( "CmdTag", String . valueOf ( targetTag1 )
        desc = new SimpleNode ( "CmdDesc", target1 );
        tree = new simpleNode ( "Start", null );
        tree . AddChild( desc, 1 );
        tree . AddChild( tag, 0 );
        tag . SetParent( tree );
        desc . SetParent( tree );
    } else if ( t.image.endsWith( target2 ) ) {
        targetTag2 = t.image.charAt( 0 );
        tag = new SimpleNode( "CmdTag", String . valueOf( targetTag2 )
        desc = new SimpleNode( "CmdDesc", target2 );
        tree = new SimpleNode( "Start", null );
        tree . AddChild( desc, 1 );
        tree . AddChild ( tag, 0 );
        tag . SetParent( tree );
        desc . SetParent( tree );
    }
    // If searching - that is, the parser was called via the
    // StartSearch( String ) method. If the end of a MENUCMD
    // token matches the string, retrieve the first char of the token.
    if ( searching && t.image.endsWith( findMe ) )
        foundMe = String . valueOf ( t.image.charAt ( 0 ) );
}
// Actions called on the CS Monitor Download screen.
private void csMonitorAction( Token t )
{
    ArtParserTokenManager . show_T( "CSMONITOR", t );
    onCSMonScr = true;
}
private void serviceAction( Token t )
{
    ArtParserTokenManager . show_T( "SERVICE", t );
    rowService = curAddr . substring( 0, 4 );
}
private void customerAction ( Token t )
(
    ArtParserTokenManager . show_T( "CUSTOMER", t );
    rowCustomer = curAddr . substring( 0, 4 );
}
private void nodeAction( Token t )
{
    ArtParserTokenManager . show_T ( "NODE", t );
    rowNode = curAddr . substring( 0, 4 );
}
private void supportAction( Token t )
{
    ArtParserTokenManager . show _T( "SUPPORT", t );
    rowSupport = curAddr . substring ( 0, 4 );
}
```

-continued

```
// Variables to record the parsing status.
//   Usage varies by parser.
private boolean lexErr = false;
private boolean synErr = false;
private boolean semErr = false
private boolean debug = false;
// Symbol table populated by parser with data
// from the CD Monitor download screen.
private SymTab st = null;
// Variables for determining the version number of the product,
// and constructing Ast trees.
private SimpleNode tag = null;
private SimpleNode desc = null;
private SimpleNode vers = null;
private static final String target1 = "EMML11";
private char targetTag1 = '?';
private static final String target2 = "Direct AMO Dialog";
private char targetTag2 = '?';
private boolean searching = false;
private String findMe = null;
private String foundMe = " ";
private final String refNumber = "| SP REFERENCE NO.";
private boolean sawRefNo = false;
private int index = -1;
private String refVersion = null;
private String version = null;
// Variables for recognizing data on the CS Monitor Download screen.
// NOTE: The ...Text strings below MUST match the strings for
// these tokens in the lexical analyzer specification!
private static final String ServiceText = "Service Area";
private static final String CustomerText = "Customer Number";
private static final String NodeText = "Node";
private static final String SupportText = "Support Center Phone No.";
private boolean onCSMonScr = false;   // on the CS Monitor screen
private String curAddr = null;        // current cursor address
private String rowService = null;     // Service Area cursor row
private String rowCustomer = null;    // Customer Number cursor row
private String rowNode = null;        // Node cursor row
private String rowSupport = null;     // Support Center cursor row
PARSER_END (ArtParser)
```

As can be seen from the above specifications, flags include "sawRefNo", and "on CSMonScr".

Figure 8:
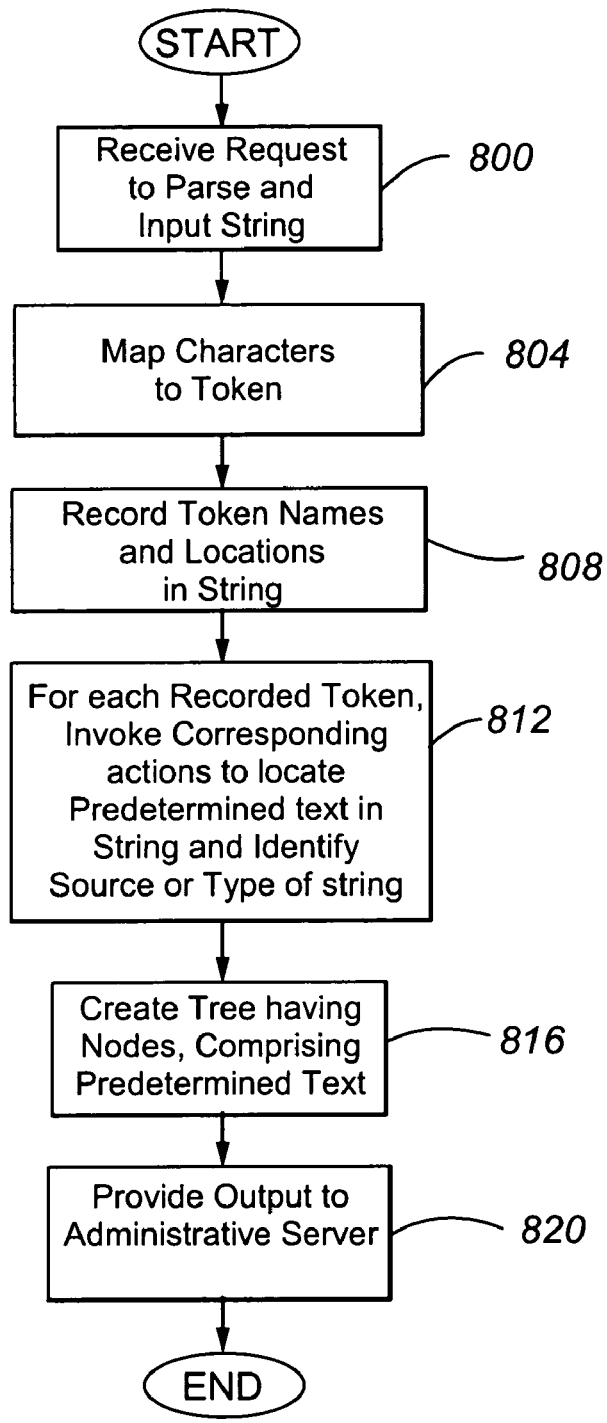
FIG. 8 is a flow chart of the operation of the heuristic parser of FIG. 7.

The operation of the heuristic parser 708 will now be described with reference to FIG. 8.

In step 800, the heuristic parser 708 receives from the administrative server a request to parse an input stream and the input stream itself.

In step 804, the parser 708 maps characters to tokens and in step 808 records the token names and locations in the input stream. As will be, appreciated, the steps for creating tokens are normally (a) to divide up a representative stream into the fewest pieces that show some repeating structure; (b) for the pieces selected as meeting design criteria, to define a token to correspond to each group including a regular expression for the group; and (c) to give each token a name.

In step 812, for each recorded token a corresponding method is invoked to locate predetermined text in the string, set appropriate flags, and thereby identify the source of the input stream and the type of input stream or corresponding input structure. Steps 804 and 812 are performed heuristically until the correct input structure is identified.

In step 816, which may be performed during or after the heuristic determination of the appropriate input structure, a parse tree is created having nodes corresponding to the predetermined characters or groupings of characters of interest to the client requestor.

After the parse is complete, the parser 708, in step 820, provides the output to the administrative server 704.

A number of variations and modifications of the invention can be used. It would be possible to provide for some features of the invention without providing others.

For example in one alternative embodiment, the parsing agent 200 is used with arbitrary streams other than alarm streams. Typically, these arbitrary streams are computer generated. Examples of such streams include graphical information such as screen scrapes, and the like.

In another alternative embodiment, the parsing agent 200, encoding agent 204, and/or heuristic parser 708 are implemented as a logic circuit, software, or as a combination of the two The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein: In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for parsing an arbitrary input stream, comprising:

a plurality of processor executable parsers operable to parse an input stream, each parser corresponding to a unique set of grammar rules;

a processor executable parser selection agent operable to receive the input stream and select a subset of the plurality of processor executable parsers to parse the input stream, wherein the input stream comprises a plurality of differing input structures and wherein the selected subset of processor executable parsers produce multiple parser outputs; and a processor executable encoding agent operable to convert the multiple parser outputs to a common grammar, wherein the processor executable parser selection agent and plurality of processor executable parsers are configured in a factory pattern and wherein the input stream comprises a plurality of telecommunication messages from a plurality of telecommunication components, each telecommunication message having a plurality of message headers comprising differing types of information.

2. The system of claim 1, wherein the multiple parser outputs correspond to differing grammars and wherein the multiple parser outputs, as converted into the common grammar, are at least one of further processed and entered into a database for later processing.

3. The system of claim 1, wherein the processor executable parser selection agent is operable to provide to a client, in response to a parse request, at least one of a parser output and an indication when at least some of the input stream is not successfully parsed and wherein the processor executable parser selection agent, prior to selection of the subset of processor executable parsers, is not informed in advance of the source or input structure associated with the at least some of the input stream.

4. A system for parsing an arbitrary input stream, comprising:
 a plurality of processor executable parsers operable to parse an input stream, each processor executable parser corresponding to a unique input structure;
 a processor executable parser selection agent operable to receive the input stream and select a subset of the plurality of processor executable parsers to parse the input stream, wherein the input stream comprises a plurality of differing input structures and wherein the selected subset of processor executable parsers produce multiple parser outputs corresponding to the plurality of differing input structures and differing grammars; and
 a processor executable encoding agent operable to convert the multiple parser outputs to a common grammar, wherein the input stream comprises fault information, the fault information being related to at least one of an alarm and an error, the fault information comprising first fault information related to a first event and in a first format and second fault information related to a second event discrete from the first event and in a second format different from the first format and wherein the processor executable encoding agent is operable to convert the first and second formats to a common format, wherein the first and second fault information uses different characters to refer to a same type of event and the encoding agent is further operable to convert the different characters to a common set of characters to refer to the event.

5. A method for parsing an arbitrary input stream, comprising:
 (a) receiving, from a telecommunication device, an input stream, the input stream comprising information defined by at least first and second input structures;
 (b) providing, by a processor executable parser selection agent and substantially simultaneously, a common portion of the input stream to each of a plurality of processor executable parsers, the plurality of processor executable parsers corresponding to differing sets of grammars;
 (c) receiving, by the processor executable parser selection agent, output from each of the plurality of processor executable parsers;
 (d) based on the plurality of outputs of the plurality of processor executable parsers:
  (i) in a first mode selecting, by the processor executable parser selection agent, a first output from a first processor executable parser that corresponds to the first input structure and a second output from a second parser that corresponds to the second input structure; and
  (ii) in a second mode, selecting, by the processor executable parser selection agent, a first processor executable parser corresponding to the first input structure to parse one or more first segments of the input stream and a second processor executable parser corresponding to the second input structure to parse one or more second segments of the input stream; and
 (e) converting a first parser output from the plurality of processor executable parsers into a second parser output corresponding to a common grammar.

6. The method of claim 5, wherein the first mode (d)(i) is performed.

7. The method of claim 6, wherein a third processor executable parser successfully parses a first portion of the input stream to form a third output and the first processor executable parser successfully parses the first portion of the input stream to form a first output and further comprising:
 determining, by the processor executable parser selection agent, which of the first and third outputs most likely corresponds to the first portion.

8. The method of claim 7, wherein the determining step is performed using a least squares fit analysis and wherein step (d) is performed using a declarative programming rather than procedural programming approach.

9. The method of claim 5, wherein the second mode (d)(ii) is performed.

10. The method of claim 5, wherein the input stream comprises a plurality of nonstandardized headers.

11. The method of claim 5, wherein the input stream is free of an embedded tag indicating a source and/or input structure associated with the input stream and wherein step (b) comprises:
 identifying one or more tokens in the input stream; and
 based on the identified one or more tokens, selecting the at least one of a plurality of processor executable parsers.

12. The method of claim 5, wherein the first processor executable parser produces a first output and the first output is a parse tree and further comprising:
 recursively evaluating at least some of the nodes in the parse tree to identify nodes requiring additional parsing.

13. The method of claim 5, wherein the first processor executable parser produces a first output and the first output is a parse tree and further comprising:
 recursively examining at least some of the nodes in the parse tree to identify nodes of interest to a client.

14. The method of claim 5, wherein the first processor executable parser produces a first output and the first output is a parse tree and wherein at least first and second nodes of the parse tree have differing formats and further comprising:
 iteratively traversing a plurality of the nodes of the parse tree to locate nodes of interest, the nodes of interest comprising the first and second nodes; and
 converting each of the located nodes of interest to a standard format.

15. The method of claim 14, wherein each of the first and second nodes use different characters to refer to a same type of event and further comprising:
 converting the characters in the first and second nodes to a common set of characters to refer to the type of event.

16. The method of claim 5, wherein each of the plurality of processor executable parsers corresponds to a unique set of tokens and grammar rules.

17. The method of claim 5, wherein each of the plurality of processor executable parsers corresponds to a unique set of attribute grammars.

18. A non-transient computer readable medium containing processor executable instructions, wherein a processor executing the instructions performs the steps of claim 5.

19. A method for parsing an arbitrary input stream, comprising:
(a) receiving an input stream, the input stream comprising information defined by at least first and second input structures;
(b) providing, substantially simultaneously, a common portion of the input stream to each of a plurality of processor executable parsers, the plurality of processor executable parsers corresponding to differing sets of grammars, wherein step (b) comprises:
determining, by a processor executable parser selection agent, for each of the at least one of a plurality of processor executable parsers whether a match or a no match condition exists, a match condition indicating that a selected processor executable parser has successfully parsed a selected segment of the input stream and a no match condition indicating that the selected processor executable parser has not successfully parsed the selected segment of the input stream; and
applying, by the processor executable parser selection agent, the following rules:
when, for a parsed segment, only one match condition is found to exist, not generating an error message;
when, for a parsed segment, a match condition is not found to exist, generating an error message; and
when, for a parsed segment, multiple match conditions are found to exist, generating an error message;
(c) receiving output from each of the plurality of processor executable parsers; and
(d) based on the outputs of the plurality of processor executable parsers, performing, by the processor executable parser selection agent, at least one of:
(i) selecting a first output from a first processor executable parser that corresponds to the first input structure and a second output from a second parser that corresponds to the second input structure; and
(ii) selecting a first processor executable parser corresponding to the first input structure to parse one or more first segments of the input stream and a second processor executable parser corresponding to the second input structure to parse one or more second segments of the input stream.

20. A method for parsing computer generated information, comprising:
receiving a stream of information, the stream being generated by one of a plurality of possible different telecommunication components, wherein each telecommunication component generates a stream corresponding to a unique input structure and wherein each of a plurality of differently structured segments of the stream is free of an embedded tag indicating a corresponding telecommunication component and/or input structure for the respective segment;
comparing, by a processor executable heuristic parser, at least a portion of the stream with multiple different sets of tokens to provide a subset of tokens identified in the at least a portion of the stream, each set of tokens corresponding to a unique input structure;
based on the subset of tokens, heuristically identifying, by the processor executable heuristic parser and from among at least one of a plurality of possible input structures and a plurality of possible telecommunication components, at least one of an input structure corresponding to the at least a portion of the stream and a telecommunication component for the at least a portion of the stream; and
thereafter parsing the stream based on the identified at least one of an input structure and telecommunication component.

21. The method of claim 20, wherein the input stream comprises a plurality of headers, wherein the headers comprise differing types of information, wherein each of the tokens has a corresponding method expressing a set of syntactical and/or semantical relationships relating to the respective token and wherein the heuristically identifying step comprises:
for each token in the subset of tokens, invoking a corresponding method.

22. The method of claim 21, wherein the comparing and heuristically identifying steps are performed using a declarative programming approach rather than a procedural programming approach, wherein the headers are nonstandardized, and wherein the invoking step comprises
setting, by an invoked method, a set of flags depending on the presence or absence of a syntactical and/or semantical relationship; and
wherein the values of the flags are used to heuristically identify the at least one of an input structure corresponding to the at least a portion of the stream and a telecommunication component for the at least a portion of the stream.

23. The method of claim 20, wherein the stream of information comprises graphical information, wherein the comparing, heuristically identifying, and parsing steps are performed by a processor executable parser, wherein the processor executable parser is not provided with a flag external to the input stream to identify or assist in the identification of the at least one of an input structure corresponding to the at least a portion of the stream and a telecommunication component for the at least a portion of the stream.

24. A non-transient computer readable medium containing processor executable instructions, wherein, when the instructions are executed by a processor, the processor performs the steps of claim 20.

25. A system, comprising:
an input operable to receive a stream of information, the stream being generated by one of a plurality of possible different telecommunication components, wherein each telecommunication component generates a stream corresponding to a unique input structure; and
a processor executable parser operable to:
(a) compare at least a portion of the stream with multiple different tokens to provide a subset of tokens identified in the at least a portion of the stream, each token corresponding to a unique input structure;
(b) based on the subset of tokens, identify, from among at least one of a plurality of possible input structures and a plurality of possible telecommunication components, at least one of an input structure corresponding to the at least a portion of the stream and a telecommunication component for the at least a portion of the stream; and
(c) parse the stream based on the identified at least one of an input structure and telecommunication component, wherein the processor executable parser is not provided with an input structure identifier, other than the corresponding input structure itself, either in or external to the at least a portion of the input stream to identify or assist in the identification of the at least one of the respective input structure corresponding to the at least a portion of the stream and a telecommunication component for the at least a portion of the stream.

26. The system of claim 25, wherein each of the tokens has a corresponding parser expressing a set of syntactical and/or semantical relationships relating to the respective token and wherein the processor executable parser is further operable, for each token in the subset of tokens, to (d) to invoke a corresponding method.

27. The system of claim 26, wherein the processor executable parser is further operable to (e) assign, by an invoked method, a set of flags with a corresponding set of values depending on the presence or absence of a syntactical and/or semantical relationship, wherein the values of the flags are used to heuristically identify the at least one of an input structure corresponding to the at least a portion of the stream and a telecommunication component for the at least a portion of the stream.

28. The system of claim 25, wherein the stream of information comprises graphical information, wherein the processor executable parser is not provided, by another telecommunication component, with a flag external to the input stream to identify or assist in the identification of the at least one of an input structure corresponding to the at least a portion of the stream and a telecommunication component for the at least a portion of the stream.

* * * * *